(12) United States Patent
Zhou et al.

(10) Patent No.: US 9,648,909 B2
(45) Date of Patent: May 16, 2017

(54) POROUS CERAMIC MATERIAL, MANUFACTURING METHOD AND USE THEREOF

(71) Applicants: SHENZHEN SMOORE TECHNOLOGY LIMITED, Shenzhen (CN); Hongming Zhou, Changsha (CN); Jian Li, Changsha (CN)

(72) Inventors: Hongming Zhou, Changsha (CN); Qinglu Xia, Changsha (CN); Kaiwen Xiao, Changsha (CN); Jian Li, Changsha (CN); Pingkun Liu, Shenzhen (CN)

(73) Assignees: SHENZHEN SMOORE TECH. LTD., Shenzhen (CN); Hongming Zhou, Changsha (CN); Jian Li, Chansha (CN)

( * ) Notice: Subject to any disclaimer, the term of this patent is extended or adjusted under 35 U.S.C. 154(b) by 0 days.

(21) Appl. No.: 14/814,093

(22) Filed: Jul. 30, 2015

(65) Prior Publication Data

US 2016/0316819 A1  Nov. 3, 2016

(30) Foreign Application Priority Data

Apr. 30, 2015  (WO) ................ PCT/CN2015/078092

(51) Int. Cl.
*C04B 38/00* (2006.01)
*A24F 47/00* (2006.01)
(Continued)

(52) U.S. Cl.
CPC ............ *A24F 47/008* (2013.01); *B05B 17/00* (2013.01); *B28B 1/24* (2013.01); *B28B 11/243* (2013.01); *C03C 11/00* (2013.01)

(58) Field of Classification Search
CPC ........... C04B 2111/00793; C04B 38/00; C04B 38/0022; C04B 38/0025; C04B 38/0032;
(Continued)

(56) References Cited

U.S. PATENT DOCUMENTS 7,578,865 B2 *  8/2009  Zuberi ............... B01D 39/2086
55/522
2015/0359262 A1 * 12/2015  Liu ........................ A24F 47/008
131/329

* cited by examiner

*Primary Examiner* — Noah Wiese
(74) *Attorney, Agent, or Firm* — Weiss & Moy, P.C.; Jeffrey D. Moy

(57) ABSTRACT

The present invention relates to a manufacturing method of a porous ceramic material, which includes the following steps: mixing a silicate material and a porogen to obtain a premix, wherein the silicate material includes sodium silicate and other compounds being at least one selected from the group consisting of oxides, nitrides, and carbides; drying the premix to obtain a silicate aggregate; mixing the silicate aggregate and an adhesive to obtain an injection molding material, wherein in a weight percentage, the silicate aggregate is in the range of from 50% to 60%, the adhesive is in the range of from 40% to 50%; injection molding the injection molding material to obtain a green body; and degumming and calcinating the green body successively to obtain the porous ceramic material. In the aforementioned manufacturing method of the porous ceramic material, the space-holder method is combined with the injection molding method, such that the obtained porous ceramic material has a high porosity, controllable pore sizes and good mechanical properties. In addition, compared with the dry pressing process, the use of the injection molding process can significantly improve the production efficiency, and is suitable for large-scale production.

9 Claims, 3 Drawing Sheets

(51) Int. Cl.
  *B05B 17/00* (2006.01)
  *B28B 1/24* (2006.01)
  *B28B 11/24* (2006.01)
  *C03C 11/00* (2006.01)

(58) Field of Classification Search
  CPC ... C04B 38/06; C04B 38/0605; C04B 38/063;
                C04B 38/0675; C04B 38/068
  USPC ..................................... 501/80, 81, 82, 83
  See application file for complete search history.

POROUS CERAMIC MATERIAL, MANUFACTURING METHOD AND USE THEREOF

FIELD OF THE INVENTION

The present disclosure relates to ceramic material manufacturing, and more particularly relates to a manufacturing method of a porous ceramic material, porous ceramic material and use thereof.

BACKGROUND OF THE INVENTION

Ceramic material is a kind of inorganic non-metallic material obtained by molding and high temperature sintering natural or synthetic compounds, which has very wide applications.

The current common industrial porous ceramic material is manufactured by space-holder method, polymeric sponge dipping method, foaming method, injection molding method, particle packing method, etc. However, these aforementioned methods all have their own limitations, for example, the porous ceramic material prepared according to space-holder method has a poor pore distribution uniformity and poor mechanical properties, as well as low production efficiency; the shape and the density of the product obtained by polymeric sponge dipping method is difficult to control; the foaming method requires a higher demand for raw materials, and the process conditions is difficult to control; the porosity of the product obtained by particle packing method is low. Therefore, it is an urgent problem how to manufacture a porous ceramic material with high porosity, controllable pore size, and good mechanical properties.

As an electronic product for smoking cessation or cigarette substitution, electronic cigarette can simulate the appearance of a conventional cigarette. When the stored liquid is heated and atomized, tar, suspended particles and other harmful ingredients in cigarettes will not be produced, and the harm of secondhand smoke and problem of fire caused by improper handled burning cigarette end will be resolved. Atomizer of an electronic cigarette is a main component for storing liquid and generating smoke. However, the current common atomizer for the electronic cigarette composed by multiple components has the disadvantages of complicated structure, complex production process and short life time.

SUMMARY OF THE INVENTION

Accordingly, it is necessary to provide a manufacturing method of a porous ceramic material with high porosity, controllable pore size, and better mechanical properties and the porous ceramic material.

It is also necessary to provide a porous ceramic material with high porosity, controllable pore size, and better mechanical properties.

It is also necessary to provide an atomizer for an electronic cigarette with high production efficiency and long life time.

A method of manufacturing a porous ceramic material includes the following steps:

mixing a silicate material and a porogen to obtain a premix, wherein the silicate material comprises sodium silicate and other compounds being at least one selected from the group consisting of oxides, nitrides, and carbides; wherein in a weight percentage, the sodium silicate is in the range of from 20% to 40%, the other compounds are in the range of from 45% to 75%, the porogen is in the range of from 3% to 20%;

drying the premix to obtain a silicate aggregate;

mixing the silicate aggregate and an adhesive to obtain an injection molding material, wherein in a weight percentage, the silicate aggregate is in the range of from 50% to 60%, the adhesive is in the range of from 40% to 50%;

injection molding the injection molding material to obtain a green body; and degumming and calcinating the green body successively to obtain the porous ceramic material.

In the aforementioned manufacturing method of the porous ceramic material, the space-holder method is combined with the injection molding method, such that the obtained porous ceramic material has a high porosity, controllable pore sizes and good mechanical properties. In addition, compared with the dry pressing process, the use of the injection molding process can significantly improve the production efficiency, and is suitable for large-scale production.

In one embodiment, the porogen is at least one selected from the group consisting of sawdust, starch, and graphite.

In one embodiment, the premix is dried at a temperature of 70° C. to 110° C. for 200 min to 400 min.

In one embodiment, in a weight percentage, the adhesive comprises 60% to 80% of paraffin wax, 5% to 15% of polypropylene, 5% to 15% of stearic acid, and 5% to 15% of dibutyl phthalate.

In one embodiment, the silicate aggregate and the adhesive are mixed at a temperature of 180° C. to 220° C. for 3 h to 5 h.

In one embodiment, injection molding conditions for the injection molding material are: injection temperature of 100° C. to 160° C.; injection pressure of 50 MPa to 140 MPa; holding pressure of 10 MPa to 30 MPa.

In one embodiment, the green body is degummed at a temperature of 200° C. to 800° C. for 3 h to 10 h.

In one embodiment, the green body is calcinated at a temperature of 800° C. to 1600° C. for 1 h to 4 h.

A porous ceramic material manufactured by the aforementioned manufacturing method.

Uses of the aforementioned porous ceramic material are provided in an atomizer of an electronic cigarette.

DETAILED DESCRIPTION OF THE EMBODIMENTS

Reference will now be made to the drawings to describe, in detail, embodiments of the present disclosure. It will be understood that the particular method and device embodying the invention are shown by way of illustration and not as a limitation of the invention. The principles and features of this invention may be employed in various and numerous embodiments without departing from the scope of the invention.

Figure 1:
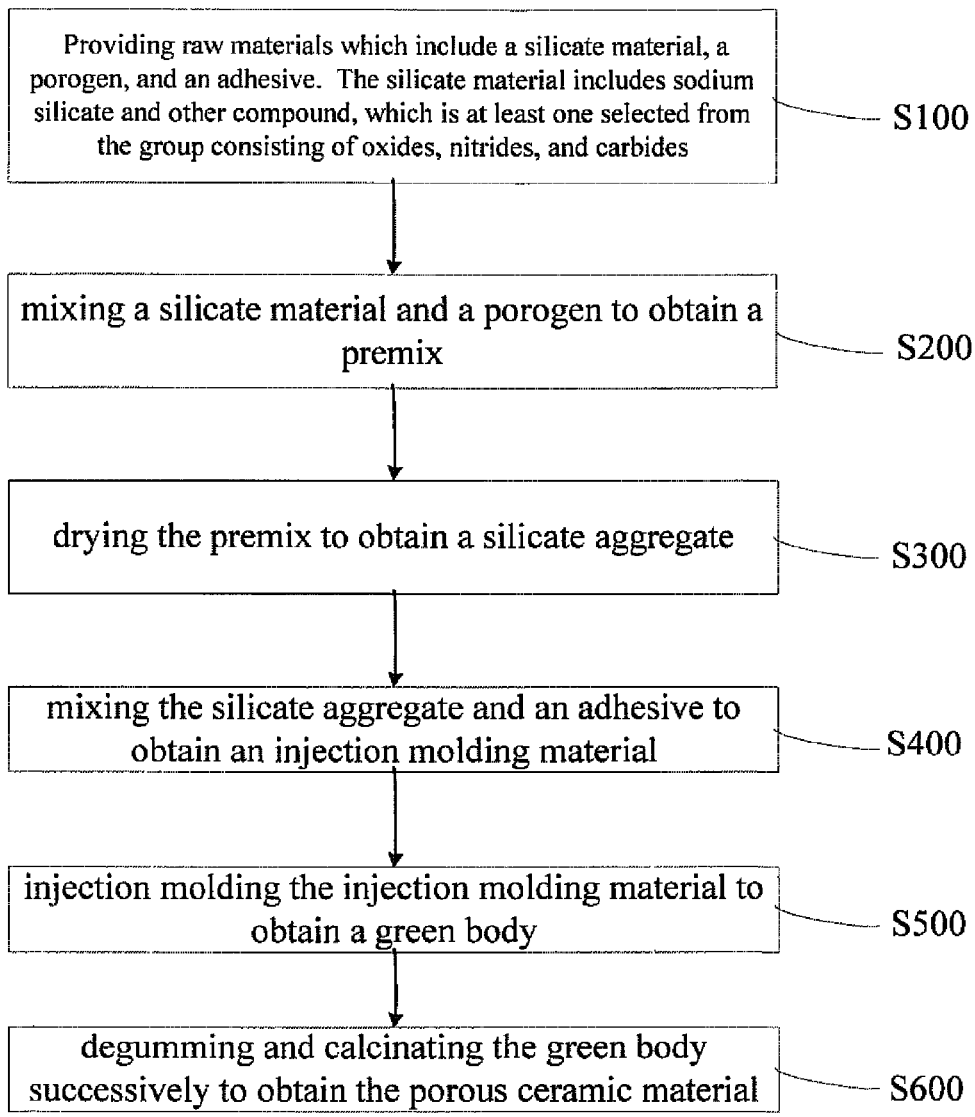
FIG. 1 is a flow chart of a manufacturing method of a porous ceramic material according to one embodiment.

Referring to FIG. 1, an embodiment of a manufacturing method of a porous ceramic material includes the following steps:

In step S100, raw materials are provided.

The raw materials include a silicate material, a porogen, and an adhesive. The silicate material includes sodium silicate and other compound, which is at least one selected from the group consisting of oxides, nitrides, and carbides. Since resource-rich and non-polluting inorganic silicate material are used as an aggregate of the porous ceramic material, sintering at a lower temperature under atmospheric air and atmospheric pressure can be achieved due to mild sintering conditions.

Specifically, the oxides include alumina, zirconia, silica, iron oxide, sodium oxide, potassium oxide, calcium oxide and magnesium oxide, etc.

Specifically, the nitrides include silicon nitride, etc.

Specifically, the carbides include silicon carbide, boron carbide, etc.

Specifically, the other compounds are crushed to have a particle size in the range of from 60 μm to 250 μm. Preferably, the other compounds are ground and sieved. Specifically, after the other compounds are ground, they pass through a 60 mesh, 200 mesh and other standard screens.

While sodium silicate acts as a raw material, it also functions as a fluxing agent, such that the sintering temperature can be effectively reduced, in addition, glass phase having a cohesive effect can be produced at a high temperature, thus enhancing the strength of the porous ceramic substrate. Specifically, the sodium silicate can be provided by anhydrous sodium silicate, sodium metasilicate nonahydrate ($Na_2SiO_3 \cdot 9H_2O$) or sodium silicate having a modulus of 1.5 to 3.5, which is a $SiO_2:Na_2O$ molar ratio in the sodium silicate. Preferably, the sodium silicate is provided by sodium silicate having a modulus of 2.6 to 2.8.

In step S200, the silicate material and the porogen are mixed to obtain a premix.

Specifically, the step S200 includes: adding the porogen and the fluxing agent to the other compounds successively with mixing to obtain the premix. Specifically, the sodium silicate is added taking a form of aqueous solution, such that the premix is a wet mixture.

Specifically, in a weight percentage, 20% to 40% of the sodium silicate, 45% to 75% of the other compounds, 3% to 20% of the porogen are mixed to obtain the premix.

Specifically, a mixing time of the silicate materials and the porogen is 0.5 h to 2 h.

Preferably, roller mill or planetary ball mill can be employed to dry mix the silicate materials and the porogen. It should be understood that, other means can be employed as long as the materials are evenly mixed, such as using a blender or kneader to dry mix them.

Specifically, the porogen is at least one selected from the group consisting of sawdust, starch, and graphite. Since complex organic or inorganic materials, such as sawdust, starch, sugar, wood fibers or short carbon fibers, are used as the porogen, the pore size and porosity of the finally obtained porous ceramic material can be controlled according to the demand, such that a communication pore structure can be obtained which is suitable for storing liquid, conducting liquid, and producing smoke.

Specifically, the particle size of the porogen is in the range of from 10 μm to 800 μm.

Preferably, the porogen with various shapes and structures can be used, thus obtaining various hole-connecting structures of the porous ceramic material. For instance, when the sawdust having a long strip shape as used as the porogen, the pore structure of the obtained porous ceramic material will have a large number of fibrous structures; when the spherical starch are used as the porogen, the pore structure of the obtained porous ceramic material will be mostly ellipsoid.

Preferably, by controlling the pore size of the porogen, the size of the pore structure of the porous ceramic material can be controlled.

Preferably, by controlling the adding amount of the porogen, the number and distribution of the pore structure of the porous ceramic material can be controlled. Accordingly, by adjusting the type, the particle size, and the blending amount of the porogen, various porous ceramic material can be prepared to meet the needs of different products.

In step S300, the premix is dried to obtain a silicate aggregate.

The conditions for drying the premix are: the premix is dried at a temperature of 70° C. to 110° C. for 200 min to 400 min.

Preferably, the drying of the premix is performed in an oven.

In step S400, the silicate aggregate and an adhesive are mixed to obtain an injection molding material.

Specifically, in a weight percentage, 50% to 60% of the silicate aggregate and 40% to 50% of the adhesive are mixed to obtain the injection molding material.

Specifically, in a weight percentage, the adhesive includes: 60% to 80% of paraffin wax (PW), 5% to 15% of polypropylene (PP), 5% to 15% of stearic acid (SA), and 5% to 15% of dibutyl phthalate (DBP). Specifically, the step S400 includes: melting PP completely at a temperature of 180° C. to 220° C., then cooling to a temperature of 170° C. to 190° C., adding the silicate aggregate, PW, mixing for 0.5 h to 1 h, adding SA, DBP, mixing for 1 h to 2 h.

Specifically, the mixing is performed at a temperature of 180° C. to 220° C. for 3 h to 5 h.

Specifically, the mixing is performed in a kneading machine.

In step S500, the injection molding material is injection molded to obtain a green body.

Preferably, prior to step S500, the injection molding material is cooled and diced for further procedure.

More preferably, the injection molding material is cooled using a natural cooling. More preferably, the injection molding material is diced to a particle size less than 5 mm.

Specifically, the dicing is performed using crushing equipment. Preferably, the dicing procedure is performed using jaw crusher equipment, roll crushers or hammer crusher equipment. It should be understood that, other mechanical equipments, such as impact crushers, cone crushers, gyratory crusher equipment, can be employed to crush the material, as long as the particle size after crushing meets the requirement.

Preferably, injection molding conditions for the injection molding material are as follows: injection temperature of 100° C. to 160° C.; injection pressure of 50 MPa to 140 MPa; holding pressure of 10 MPa to 30 MPa. It should be understood that, the injection process parameters can be adjusted according to the different ratio of materials.

Preferably, the injection molding of the injection molding material is performed in an injection molding machine, for example, the injection molding material are fed to the hopper of the injection molding machine, after the injection process parameters are set, the injection molding is performed to obtain the green body.

By using the injection molding process to manufacture the porous ceramic material, a plurality of green bodies can be produced one-time, such that the products have less shrinkage, and the production efficiency is improved, which is suitable for large-scale industrial production.

In step S600, the green body is degummed and a calcinated successively to obtain the porous ceramic material.

Preferably, the green body is degummed at a temperature of 200° C. to 800° C. for 3 h to 10 h. More preferably, the green body is heated up to 200° C. to 800° C. at a heating rate of l° C./min to 10° C./min.

Specifically, the degumming of the green body can be performed at different temperature stages, such that different physical and chemical reactions can take place at different temperature stages. Specifically, the physical and chemical reactions at different temperature stages includes: removing of the hydration water, removing of constitutional water, removing of porogen, degumming of the adhesive. Specifically, the holding time at each temperature stage is 0.5 h to 2 h.

Preferably, the conditions of the calcining process of the green body are as follows: at a temperature of 800° C. to 1600° C., incubated for 1 h to 4 h. More preferably, the green body is heated up to 800° C. to 1600° C. at a heating rate of 0.5° C./min to 5° C./min.

Specifically, after step S600, the method further includes: naturally cooling the porous ceramic material.

In the aforementioned manufacturing method of the porous ceramic material, the space-holder method is combined with the injection molding method, such that the obtained porous ceramic material has a high porosity, controllable pore sizes and good mechanical properties. In addition, compared with the dry pressing process, the use of the injection molding process can significantly improve the production efficiency, and is suitable for large-scale production.

An embodiment of a porous ceramic material is provided, which is manufactured by the aforementioned manufacturing method of the porous ceramic material.

Specifically, the porosity of the porous ceramic material can be 35% to 70%, and the pore size can be 200 nm to 2 µm.

The porous ceramic material can be used in an atomizer of an electronic cigarette.

The atomizer of the electronic cigarette needs to both store liquid and to atomize partial liquid at each time, which results in a complicated structure and complex manufacturing processing. Accordingly, the porous ceramic material with proper composition, high porosity, and good mechanical properties is favorable for the atomizer of the electronic cigarette.

Specifically, the atomizer of the electronic cigarette uses the porous ceramic material to store liquid. The aforementioned porous ceramic material has a simple manufacturing process, low sintering temperature, as well as high porosity and good mechanical properties. When the porous ceramic material is used to store liquid, the amount of smoke can be well controlled, such that the structure of the atomizer of the electronic cigarette is simplified, and the manufacturing processing is simple, and the atomizer has a good performance.

Figure 2:
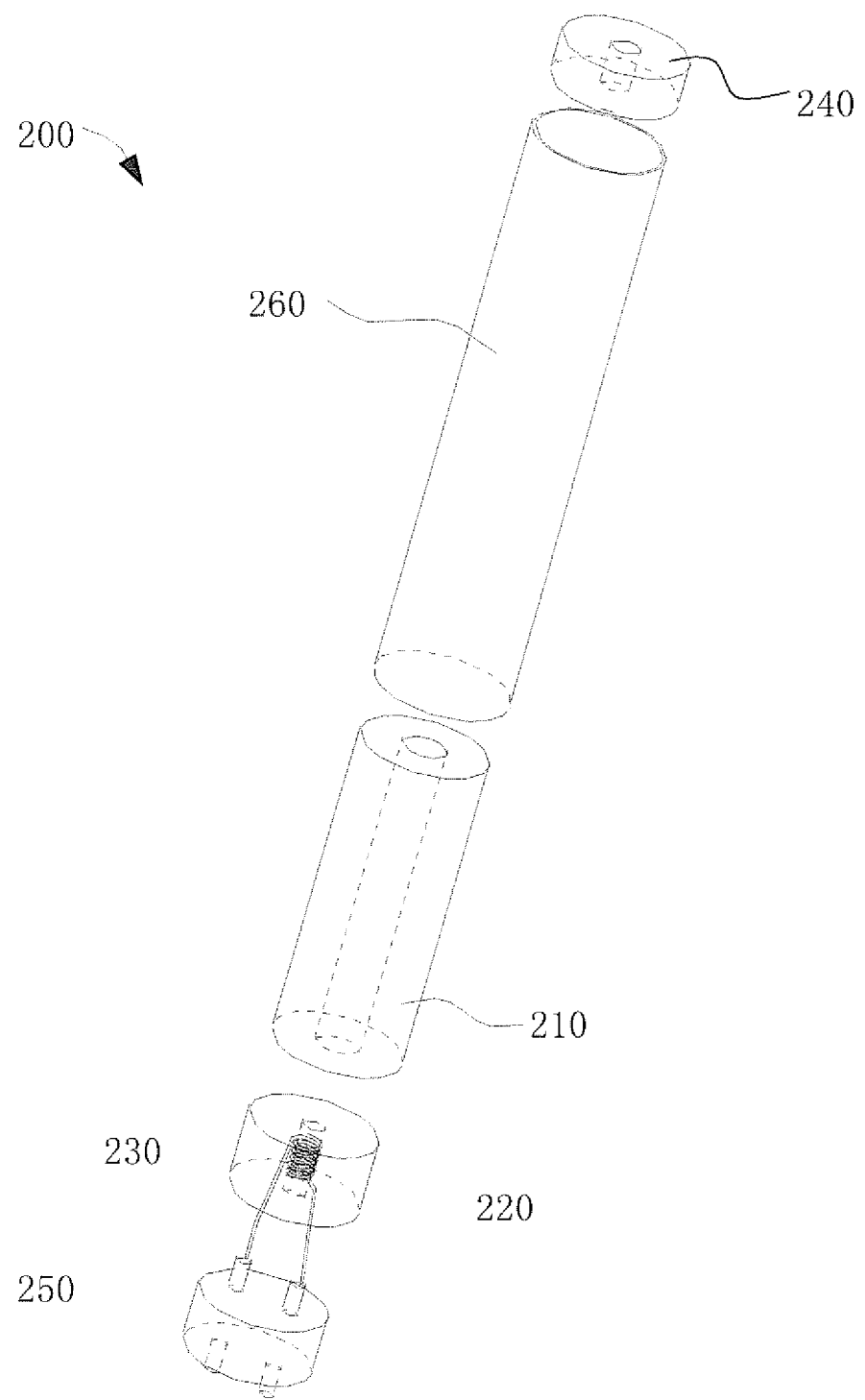
FIG. 2 is a disassembled perspective view of an electronic cigarette according to an embodiment.

Referring to FIG. 2, an embodiment of an electronic cigarette 200 includes a liquid reservoir 210, a liquid absorption element 220, and an atomizing element 230. The liquid is stored in the liquid reservoir 210. The liquid absorption element 220 is filled with the aforementioned porous ceramic material. The liquid reservoir 210 is connected to the liquid absorption element 220, and the atomizing element 230 is in contact with the porous ceramic material of the liquid absorption element 220, such that the liquid from the liquid reservoir 210 can be absorbed by the porous ceramic material as it enters the liquid absorption element 220, and the atomizing element 230 atomizes the liquid absorbed by the porous ceramic material.

Figure 3:
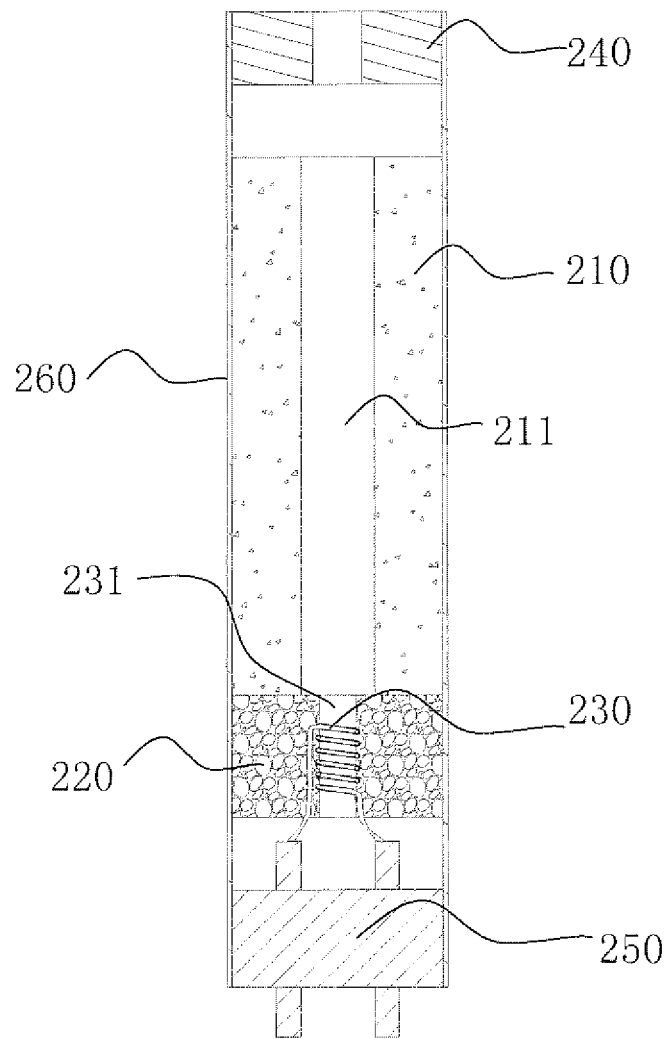
FIG. 3 is a cross-sectional view of the electronic cigarette of FIG. 2.

Referring to FIG. 2 and FIG. 3, specifically, the atomizing element 230 defines a first air passage 231, and the atomized liquid can enter into the external of the electronic cigarette 200 via the first atomizing passage 231.

Specifically, the liquid reservoir 210 defines a second air passage 211 in communication with the first air passage 231. Specifically, the electronic cigarette 200 further includes a mouthpiece 240 connected to the liquid reservoir 210 and communicated with the second air passage 211 of the liquid reservoir 210.

Specifically, in the illustrated embodiment, the atomizing element 230 is a heating wire, which can heat and atomize the liquid absorbed by the porous ceramic material.

Additionally, the electronic cigarette 200 further includes a power connector 250. The power connector 250 is connected to the atomizing element 230, and the atomizing element 230 is driven by connecting the power connector 250 to a power source, etc.

Additionally, the electronic cigarette 200 further includes a housing 260. The liquid reservoir 210, the liquid absorption element 220, the atomizing element 230, the mouthpiece 240, and the power connector 250 are located in the housing 260.

The liquid absorption element 220 of the electronic cigarette 200 uses the porous ceramic material to absorb liquid from the liquid reservoir 210, due to the good mechanical properties, high porosity of the porous ceramic material, the liquid absorption element 220 not only can store the liquid, but also can well control the amount of the smoke, thus simplifying the structure of the electronic cigarette. Accordingly, the aforementioned electronic cigarette 200 has the advantages of simple structure, easy production, good performance, and long service life.

The specific examples of manufacturing the porous ceramic material are described below.

The performance testing conditions for the porous ceramic material according to the examples are as follows: the porosity of the porous ceramic material is measured using Archimedes method; the flexural strength of the porous ceramic material is measured using universal testing machine according to GB/T 4741-1999; the average pore size of porous ceramic material is measured using BET surface area analyzer.

Example 1

After the alumina powder was ground and passed through a 80 mesh screen, 400 g of alumina powder was weighed, 60 g of sawdust which passed through 80 to 100 mesh screen was added, the mixture was mixed in a ball mill for 30 min, 230 g of industrial sodium silicate with a modulus of 2.6 was added, stirred and mixed for 30 min to obtain a premix.

The premix was placed in oven and dried at 80° C. for 400 min, so as to obtain dry silicate aggregate.

The mixer was preheated to 220° C., 20 g of polypropylene was then added to the mixer. After the polypropylene was melt completely, it was cooled to 170° C., 400 g of silicate aggregate, 300 g of paraffin wax were then added, mixed for 1 h; 40 g of stearic acid, 40 g of dibutyl phthalate were continuously added, mixed for 2 h, thus obtaining the injection molding material.

The injection molding material was cooled, diced by jaw crusher equipment. The diced injection molding material was fed to the hopper of an injection molding machine and injection molded to obtain a green body, the injection temperature was 135° C., the injection pressure was 140 MPa, and the holding pressure was 10 MPa. The size of the green body can be supplied.

The green body was placed into a high temperature and atmospheric pressure resistance furnace, heated up to 200° C. at a heating rate of 5° C./min, incubated for 2 h, then heated up to 300° C. at the same heating rate, incubated for 1 h, heated up to 420° C., incubated for 2 h, heated up to 500° C. at a heating rate of 2° C./min, incubated for 1 h, such that the hydration water, the constitutional water, the porogen, and the adhesive were removed. The sample was then heated up to 1400° C. at a heating rate of 2° C./rain and sintered for 1 h, furnace cooled to obtain the porous ceramic material.

The measuring of porosity, bending strength, average pore size of the porous ceramic material was performed. Under these conditions, the porosity of the porous ceramic material was 49.58%, the bending strength was 15.60 Mpa, and an average pore size is 1.250 μm.

Example 2

After the zirconia powder was ground and passed through a 60 mesh screen, 400 g of zirconia powder was weighed, 80 g of sawdust which passed through 80 to 100 mesh screen was added, the mixture was mixed in a ball mill for 40 min, 160 g of industrial sodium silicate with a modulus of 2.8 was added, stirred and mixed for 20 min to obtain a premix.

The premix was placed in oven and dried at 100° C. for 300 min, so as to obtain dry silicate aggregate.

The mixer was preheated to 220° C., 40 g of polypropylene was then added to the mixer. After the polypropylene was melt completely, it was cooled to 170° C., 400 g of silicate aggregate, 280 g of paraffin wax were then added, mixed for 1 h; 40 g of stearic acid, 40 g of dibutyl phthalate were continuously added, mixed for 2 h, thus obtaining the injection molding material.

The injection molding material was cooled, diced by jaw crusher equipment. The diced injection molding material was fed to the hopper of an injection molding machine and injection molded to obtain a green body, the injection temperature was 140° C., the injection pressure was 120 MPa, and the holding pressure was 20 MPa.

The green body was placed into a high temperature and atmospheric pressure resistance furnace, heated up to 200° C. at a heating rate of 2° C./min, incubated for 2 h, then heated up to 300° C. at the same heating rate, incubated for 1 h, heated up to 420° C., incubated for 2 h, heated up to 500° C. at a heating rate of 2° C./min, incubated for 1 h, such that the hydration water, the constitutional water, the porogen, and the adhesive were removed. The sample was then heated up to 1200° C. at a heating rate of 2° C./min and sintered for 1 h, furnace cooled to obtain the porous ceramic material. The measuring of porosity, bending strength, average pore size of the porous ceramic material was performed. Under these conditions, the porosity of the porous ceramic material was 64.71%, the bending strength was 10.70 Mpa, and an average pore size is 1.885 μm.

Example 3

After the silicon nitride powder was ground and passed through a 100 mesh screen, 400 g of silicon nitride powder was weighed, 133 g of graphite which passed through 200 mesh screen was added, the mixture was mixed in a ball mill for 30 min, 355 g of industrial sodium silicate with a modulus of 1.5 was added, stirred and mixed for 30 min to obtain a premix.

The premix was placed in oven and dried at 110° C. for 300 min, so as to obtain dry silicate aggregate.

The mixer was preheated to 220° C., 20 g of polypropylene was then added to the mixer. After the polypropylene was melt completely, it was cooled to 170° C., 400 g of silicate aggregate, 320 g of paraffin wax were then added, mixed for 1 h; 40 g of stearic acid, 40 g of dibutyl phthalate were continuously added, mixed for 2 h, thus obtaining the injection molding material.

The injection molding material was cooled, diced by jaw crusher equipment. The diced injection molding material was fed to the hopper of an injection molding machine and injection molded to obtain a green body, the injection temperature was 160° C., the injection pressure was 140 MPa, and the holding pressure was 30 MPa.

The green body was placed into a high temperature and atmospheric pressure resistance furnace, heated up to 200° C. at a heating rate of 4° C./min, incubated for 2 h, then heated up to 420° C. at a heating rate of 2° C./min, incubated for 1 h, heated up to 600° C. at a heating rate of 2° C./min, incubated for 1.5 h, such that the hydration water, the constitutional water, the porogen, and the adhesive were removed. The sample was then heated up to 1600° C. at a heating rate of 2° C./min and sintered for 1 h, furnace cooled to obtain the porous ceramic material. The measuring of porosity, bending strength, average pore size of the porous ceramic material was performed. Under these conditions, the porosity of the porous ceramic material was 36.95%, the bending strength was 19.60 Mpa, and an average pore size is 270 nm.

Example 4

The diatomite mineral raw material was ground and passed through a 150 mesh screen, which includes, in a weight percentage, 90% of silica, 6% of alumina, 1% of ferric oxide, 2.5% of sodium oxide, 0.5% of other. 400 g of diatomite mineral raw material was weighed, 40 g of starch which passed through 300 mesh screen was added, the mixture was mixed in a ball mill for 30 min, 200 g of industrial sodium silicate with a modulus of 3.5 was added, stirred and mixed for 30 min to obtain a premix.

The premix was placed in oven and dried at 80° C. for 300 min, so as to obtain dry silicate aggregate.

The mixer was preheated to 200° C., 32 g of polypropylene was then added to the mixer. After the polypropylene was melt completely, it was cooled to 170° C., 400 g of silicate aggregate, 240 g of paraffin wax were then added, mixed for 1 h; 26 g of stearic acid, 22 g of dibutyl phthalate were continuously added, mixed for 2 h, thus obtaining the injection molding material.

The injection molding material was cooled, diced by jaw crusher equipment. The diced injection molding material was fed to the hopper of an injection molding machine and injection molded to obtain a green body, the injection temperature was 120° C., the injection pressure was 80 MPa, and the holding pressure was 10 MPa.

The green body was placed into a high temperature and atmospheric pressure resistance furnace, heated up to 200° C. at a heating rate of 2° C./min, incubated for 2 h, then heated up to 380° C. at the same heating rate, incubated for 1 h, heated up to 420° C., incubated for 1 h, heated up to 500° C. at a heating rate of 2° C./min, incubated for 1 h, such that the hydration water, the constitutional water, the porogen, and the adhesive were removed. The sample was then heated up to 950° C. at a heating rate of 2° C./min and sintered for 1 h, furnace cooled to obtain the porous ceramic material. The measuring of porosity, bending strength, average pore size of the porous ceramic material was performed. Under these conditions, the porosity of the porous ceramic material was 40.47%, the bending strength was 17.60 Mpa, and an average pore size is 475 nm.

Example 5

The feldspar-kaolin mineral raw material was ground and passed through a 250 mesh screen, which includes, in a weight percentage, 65% of silica, 28% of alumina, 0.5% of ferric oxide, 2.5% of sodium oxide, 0.5% of other. 400 g of feldspar-kaolin mineral raw material was weighed, 12 g of starch which passed through 300 mesh screen was added, the mixture was mixed in a ball mill for 30 min, 85 g of industrial sodium silicate with a modulus of 2.5 was added, stirred and mixed for 30 min to obtain a premix.

The premix was placed in oven and dried at 80° C. for 300 min, so as to obtain dry silicate aggregate.

The mixer was preheated to 180° C., 40 g of polypropylene was then added to the mixer. After the polypropylene was melt completely, it was cooled to 170° C., 400 g of silicate aggregate, 160 g of paraffin wax were then added, mixed for 1 h; 40 g of stearic acid, 27 g of dibutyl phthalate were continuously added, mixed for 2 h, thus obtaining the injection molding material.

The injection molding material was cooled, diced by jaw crusher equipment. The diced injection molding material was fed to the hopper of an injection molding machine and injection molded to obtain a green body, the injection temperature was 100° C., the injection pressure was 50 MPa, and the holding pressure was 10 MPa.

The green body was placed into a high temperature and atmospheric pressure resistance furnace, heated up to 200° C. at a heating rate of 2° C./min, incubated for 2 h, then heated up to 380° C. at the same heating rate, incubated for 40 min, heated up to 420° C., incubated for 1 h, heated up to 500° C. at a heating rate of 2° C./min, incubated for 40 min, such that the hydration water, the constitutional water, the porogen, and the adhesive were removed. The sample was then heated up to 800° C. at a heating rate of 2° C./min and sintered for 2 h, furnace cooled to obtain the porous ceramic material. The measuring of porosity, bending strength, average pore size of the porous ceramic material was performed. Under these conditions, the porosity of the porous ceramic material was 44.82%, the bending strength was 13.35 Mpa, and an average pore size is 200 nm.

Comparative Example

The diatomite mineral raw material was ground and passed through a 150 mesh screen, which includes, in a weight percentage, 90% of silica, 6% of alumina, 1% of ferric oxide, 2.5% of sodium oxide, 0.5% of other. 100 g of diatomite mineral raw material was weighed, 10 g of starch which passed through 300 mesh screen was added, the mixture was mixed in a ball mill for 30 min, 50 g of industrial sodium silicate with a modulus of 3.5 was added, stirred and mixed for 30 min to obtain a wet material. The wet material was placed to a cylindrical mold, pressed under a pressure of 8 MPa to form a desired green compact.

The green compact was placed into a high temperature and atmospheric pressure resistance furnace, heated up to 600° C. at a heating rate of 2° C./min, incubated for 2 h to remove water. The sample was then heated up to 800° C. at a heating rate of 2° C./min and sintered for 2 h, furnace cooled to obtain the porous ceramic material. The measuring of porosity, bending strength, average pore size of the porous ceramic material was performed. Under these conditions, the porosity of the porous ceramic material was 72.12%, the bending strength was 9.60 Mpa, and an average pore size is 621 nm.

It can be inferred from the Example 1 to Example 5 that, the porous ceramic material manufactured according to the method of the present invention has a high porosity and good mechanical properties, e.g., the obtained porous ceramic materials have a porosity ranging from 35% to 70%, bending strength ranging from 10.7 Mpa to 20 MPa, pore size ranging from 200 nm to 2 μm. Meanwhile, comparing the Examples 1-5 to the Comparative Example, it can be found that, although the porosity of the sample of the Comparative Example is high, which is obtained using dry pressing, the compressive strength is very low and cannot meet the requirements.

Comparing the Comparative Example with Example 4, it can be found that, the compositions of aggregate of the Comparative Example with Example 4 are the same, while the subsequent sintering processes are different. In can be inferred that, when the dry pressuring process is employed in the Comparative Example, as the raw material contains water, the stripping of mold after molding is very difficult, and phenomenon such as solder and release are easy to occur, thus resulting that the strength of the green compact is not high enough, and the green compact may be deformed or damaged during the transportation. However, the Example 4 employs the injection molding process, the injected sample can be fast cured at low temperature due to the adhesive, such that the sample has a smooth surface, which is not prone to be bonded to the mold and easy to stripping, while the sample has a certain strength, and is less likely to be deformed or damaged during the transportation.

It can be seen that, in the subsequent sintering process, the sample molded by dry pressing process will subjected to uneven stress, such that the green compact is prone to cracking, damage and other phenomena during the sintering process. However, regarding to the injection molding process, as long as the parameters such as injection temperature, injection pressure, holding pressure and the time of an injection molding process are kept unchanged, the obtained porous ceramic material exhibits a stable performance and a uniform structure, the cracking and damaging phenomena is reduced during the sintering process.

The technical features of each embodiment can be combined at an arbitrary. In order to describe in a concise way, not all the possible combinations of the technical features of the above embodiments are described. However, they should be considered within the scope of the present invention, as long as the combination of these technical features is in no contradiction.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A method of manufacturing a porous ceramic material, comprising the following steps:

mixing a silicate material and a porogen to obtain a premix, wherein the silicate material comprises sodium silicate and other compounds being at least one selected from the group consisting of oxides, nitrides, and carbides; wherein in a weight percentage, the sodium silicate is in the range of from 20% to 40%, the other compounds are in the range of from 45% to 75%, the porogen is in the range of from 3% to 20%;

drying the premix to obtain a silicate aggregate;

mixing the silicate aggregate and an adhesive to obtain an injection molding material, wherein in a weight percentage, the silicate aggregate is in the range of from 50% to 60%, the adhesive is in the range of from 40% to 50%;

injection molding the injection molding material to obtain a green body; and degumming and calcinating the green body successively to obtain the porous ceramic material.

2. The method of manufacturing the porous ceramic material according to claim 1, wherein the porogen is at least one selected from the group consisting of sawdust, starch, and graphite.

3. The method of manufacturing the porous ceramic material according to claim 1, wherein the premix is dried at a temperature of 70° C. to 110° C. for 200 min to 400 min.

4. The method of manufacturing the porous ceramic material according to claim 1, wherein in a weight percentage, the adhesive comprises 60% to 80% of paraffin wax, 5% to 15% of polypropylene, 5% to 15% of stearic acid, and 5% to 15% of dibutyl phthalate.

5. The method of manufacturing the porous ceramic material according to claim 1, wherein the silicate aggregate and the adhesive are mixed at a temperature of 180° C. to 220° C. for 3 h to 5 h.

6. The method of manufacturing the porous ceramic material according to claim 1, wherein injection molding conditions for the injection molding material are: injection temperature of 100° C. to 160° C.; injection pressure of 50 MPa to 140 MPa; holding pressure of 10 MPa to 30 MPa.

7. The method of manufacturing the porous ceramic material according to claim 1, wherein the green body is degummed at a temperature of 200° C. to 800° C. for 3 h to 10 h.

8. The method of manufacturing the porous ceramic material according to claim 1, wherein the green body is calcinated at a temperature of 800° C. to 1600° C. for 1 h to 4 h.

9. The method of manufacturing the porous ceramic material according to claim 1, comprising forming the porous ceramic material into an atomizer of an electronic cigarette.

* * * * *